UNITED STATES PATENT OFFICE.

COLUMBUS COBLENTZ, OF SPRINGFIELD, OHIO.

IMPROVEMENT IN STOPPERS OR BUNGS.

Specification forming part of Letters Patent No. 149,443, dated April 7, 1874; application filed March 14, 1874.

*To all whom it may concern:*

Be it known that I, COLUMBUS COBLENTZ, of Springfield, in the county of Clarke and State of Ohio, have invented a new and valuable Improvement in Stoppers or Bungs; and I do hereby declare that the following is a full, clear, and exact description of the construction of the same.

My object is to produce a new and improved article of manufacture, to wit: A stopper for a bottle or a bung for a barrel, which will possess all the yielding and accommodating qualities of cork and rubber stoppers, and be much cheaper than stoppers made of these substances. My invention consists in a bottle-stopper or bung, which is made of asbestus and some suitable agglutinant, which will cause the fibers or particles of this substance to firmly cohere to each other, and form, when properly molded, a stopple, which will possess the requisite degree of elasticity and flexibility.

I take the substance known as asbestus, and, after properly reducing it, I mix with it a solution of india-rubber, gutta-percha, cellulose, or other suitable substance, which will cause the particles of asbestus to firmly cohere to each other, and form a mass which will possess the requisite qualities for the purpose intended.

While the compound is in a plastic state it is formed into stopples and bungs of various sizes and shapes, by pressing it into suitable molds.

The asbestus has no odor, but if rubber or gutta-percha be used as the agglutinant, the odor of either of these latter substances may be destroyed, or greatly modified, by the use of some sweet-scented oil or extract.

What I claim as new, and desire to secure by Letters Patent, is—

A bottle-stopper or a bung composed of asbestus, properly reduced and mixed with an agglutinant, as herein set forth.

In testimony that I claim the above I have hereunto subscribed my name in the presence of two witnesses.

COLUMBUS COBLENTZ.

Witnesses:
H. S. SHOWAS,
F. C. RUNYAN.